R. & A. Renz
Shears.

No. 116868

PATENTED JUL 11 1871

Witnesses.
Richard P. Lyon
John B. Robertson

Robert Renz
Andrew Renz, Inventors.
by R. Fitzgerald, Atty.

UNITED STATES PATENT OFFICE.

ROBERT RENZ AND ANDREW RENZ, OF NAUGATUCK, CONNECTICUT.

IMPROVEMENT IN THE MANUFACTURE OF SHEARS AND SCISSORS.

Specification forming part of Letters Patent No. 116,868, dated July 11, 1871.

*To all whom it may concern:*

Be it known that we, ROBERT RENZ and ANDREW RENZ, both of Naugatuck, in the county of New Haven and State of Connecticut, have invented a new and useful Improvement in the Manufacture of Shears and Scissors; and we do hereby declare that the following is a full, clear, and exact description of the construction, character, and operation of the same, reference being had to the accompanying drawing which makes part of this specification, in which—

Figure 1:
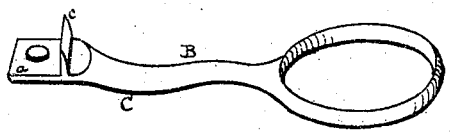
Figure 2:
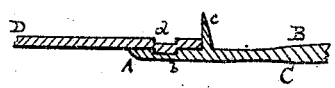
Figure 3:
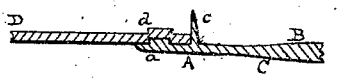
Figure 4:
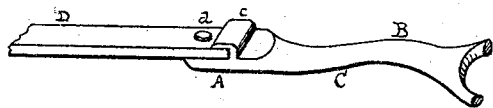

Figure 1 is a perspective view of the cast-iron handle (and its shank) of the shears, showing how the shank is prepared for receiving the end of the steel blade preparatory to its being welded. Fig. 2 is a longitudinal section of the joint of the shank and blade before being welded, showing a recess in the flat portion of the shank and a projection on the blade which fit each other. Fig. 3 is the same section, showing the projection on the shank and the recess in the blade. Fig. 4 is a perspective view of the blade and shank, secured together by means of the recess and projection and by bending down the plate, which we cast perpendicularly to and across the flat portion of the shank, so as to hold the shank and blade in place while being welded.

Our improvement consists in the novel manner of making shears and scissors with cast-iron handles and steel blades by welding the parts together when the parts are fitted for such welding, substantially as hereinafter described and set forth.

We make each part of the handle B, with its shank C, of malleable cast-iron, by casting it substantially in the form shown in perspective in Fig. 1—that is, by casting the end of the shank flat, as represented at A, Fig. 1, with a slight projection in the central part, as represented at *a*, Figs. 1 and 3; or with a slight depression, as represented at *b*, Fig. 2; or with a slightly-projecting ring or segment of a ring—and with an upright plate cast perpendicularly to and across the flat portion A, as shown at *c*, Figs. 1, 2, 3, and 4, to assist in holding the parts together when about to be welded.

We make each of the blades D of cast-steel (or any other suitable steel) by cutting it from a plate of suitable thickness and of any desired size and shape, and near the end which is to be welded to the shank of the handle we punch or swage it with suitable dies so as to form a recess on one side and a projection on the other, as indicated in section at *d*, Figs. 2 and 3, so that the projection may fall into the recess *b*, as shown in Fig. 2; or the recess may pass over the projection *a* in the shank, as shown in Fig. 3, or so that either may work with the projecting ring or segment of a ring before named.

Having made the parts as before described, we place the recess *d* in the blade onto the projection *a*, Figs. 1 and 3, as represented in Fig. 3, or the projection *d* into the recess *b*, as represented in Fig. 2, and turn down the cross-plate *c* onto the end of the blade, as represented in Fig. 4, so that the recess and projection and the turned-down plate will hold the parts firmly in their position and ready for welding. We then (after properly heating) place the two parts, so clamped together, under a drop or between swaging-dies, and weld them in a secure and perfect manner; or we weld them by any other suitable means. We then drill the hole for the screw, or fulcrum on which the parts or levers work, through the blade and shank in the place where the recess and projection were united, so large as to remove every particle which has been affected by them, so that the parts are entirely sound, having nothing of the scaly or riveting character about them. We then grind and finish the shears or scissors, when no appearance of the weld or joining will be visible, and the shears or scissors are as fair to look upon and as good for use as any of the shears or scissors made wholly of cast-steel.

The advantages of our improvement in manufacturing shears and scissors consist, principally, in the fact that no other process of joining and holding the parts together for welding has enabled any one to weld the blades to the cast-iron shanks so smoothly or firmly, or at so small an expense of labor and machinery.

We are aware that steel has been welded to malleable cast-iron for many years, and that shears, &c., have long been made by riveting or screwing the steel blades to cast-iron shanks in a variety of ways. We therefore do not claim welding steel to cast-iron, as such; nor do we claim making shears of cast-iron and steel, put together as such, as our invention; but

What we claim as our invention, and desire to secure by Letters Patent, is—

The method hereinbefore described of preparing the two parts, the handle and the blade, and of uniting the same together.

ROBERT RENZ.
ANDREW RENZ.

Witnesses:
  VERREIN S. MUNGER,
  B. A. PECK.